US012619012B2

(12) United States Patent
Jentsch et al.

(10) Patent No.: US 12,619,012 B2
(45) Date of Patent: May 5, 2026

(54) OPTICAL DEVICE AND INJECTION MOLDING METHOD FOR PRODUCING SAME

(71) Applicants: FEV Group GmbH, Aachen (DE); UPT-Optik Wodak GmbH, Nuremberg (DE)

(72) Inventors: Steffen Jentsch, Osnabrück (DE); Martin Mueller, Osnabrück (DE); Horst Wodak, Nuremberg (DE); Martin Rümmelein, Nuremberg (DE)

(73) Assignees: FEV Group GmbH, Aachen (DE); UPT-Optik Wodak GmbH, Nuremberg (DE)

( * ) Notice: Subject to any disclaimer, the term of this patent is extended or adjusted under 35 U.S.C. 154(b) by 301 days.

(21) Appl. No.: 18/504,697

(22) Filed: Nov. 8, 2023

(65) Prior Publication Data

US 2024/0069251 A1 Feb. 29, 2024

Related U.S. Application Data

(63) Continuation of application No. PCT/DE2022/100306, filed on Apr. 22, 2022.

(30) Foreign Application Priority Data

May 8, 2021 (DE) ..................... 10 2021 002 458.3

(51) Int. Cl.
*G02B 3/00* (2006.01)
*B29C 45/14* (2006.01)
(Continued)

(52) U.S. Cl.
CPC ......... *G02B 3/0031* (2013.01); *G02B 3/0062* (2013.01); *B29C 45/14434* (2013.01); *B29K 2069/00* (2013.01); *B29L 2011/0016* (2013.01)

(58) Field of Classification Search
CPC ................ G02B 3/0031; G02B 3/0062; B29C 45/14434; B29C 45/372; B29C 45/14819; (Continued)

(56) References Cited

U.S. PATENT DOCUMENTS 7,108,415 B2    9/2006   Hayakawa
2013/0271826 A1*   10/2013   Widmer ................ B29C 39/123
                                                                     359/811
2019/0331316 A1    10/2019   Shellhause et al.

FOREIGN PATENT DOCUMENTS

DE        102012204341 A1     9/2013
DE        102014012375 A1     2/2016
(Continued)

OTHER PUBLICATIONS

International Search Report issued in corresponding International Application PCT/DE2022/100306, mailed Aug. 24, 2022.

*Primary Examiner* — James C. Jones
(74) *Attorney, Agent, or Firm* — Burris Law, PLLC

(57) ABSTRACT

An optical device includes: a transparent substrate and a coherent transparent layer enclosing the substrate in at least three places, which: forms a plurality of first optical lenses on a first surface and forms a plurality of second optical lenses on a second surface of the substrate arranged opposite the first surface, the transparent layer having a predetermined thickness. A method of manufacturing the optical device is also provided.

11 Claims, 3 Drawing Sheets

(51) Int. Cl.
    *B29K 69/00*        (2006.01)
    *B29L 11/00*        (2006.01)
(58) Field of Classification Search
    CPC ........ B29K 2069/00; B29K 2995/0026; B29L
                    2011/0016; B29L 2011/00; B29D
                                            11/00298
    See application file for complete search history.

(56)                    References Cited

FOREIGN PATENT DOCUMENTS

DE        102015121691 A1      6/2017
DE        102018220514 A1      5/2020
EP              2952360 A1     12/2015

* cited by examiner

S1

S2

S3

OPTICAL DEVICE AND INJECTION MOLDING METHOD FOR PRODUCING SAME

CROSS-REFERENCE TO RELATED APPLICATIONS

This application is a continuation of International Application No. PCT/DE2022/100306, filed on Apr. 22, 2022, which claims priority to and the benefit of DE 102021002458.3 filed on May 8, 2021. The disclosures of the above applications are incorporated herein by reference.

FIELD

The present disclosure relates to an optical device and a method of manufacturing an optical device.

BACKGROUND

The statements in this section merely provide background information related to the present disclosure and may not constitute prior art.

DE102015121691 A1 discloses a method for producing a micro-lens array comprising at least one light-permeable base body with a flat extension, wherein the base body has a micro-lens structure on at least one base surface. At least one base body is produced with an injection molding tool in an injection molding process, so that the micro-lens structure is molded from a negative structure in the injection molding tool.

SUMMARY

This section provides a general summary of the disclosure and is not a comprehensive disclosure of its full scope or all of its features.

The optical device according to the disclosure of the present application includes a transparent substrate, and a coherent transparent layer enclosing the substrate on at least three sides, which forms a plurality of first optical lenses on a first surface, and forms a plurality of second optical lenses on a second surface arranged opposite the first surface of the substrate. The transparent layer has a predetermined thickness.

Substrates and/or layers that are permeable to a certain proportion of incident light of a certain wavelength are regarded as "transparent". Preferably, the specific proportion of transmitted light in a wavelength range between 400 nm and 750 nm is greater than 90%.

The invention is intended specifically for use as a microscope projector. It is based on the task of creating a low-cost optical element with a small installation space, which can project a sharp, undistorted image.

Since the coherent transparent layer encloses the substrate on at least three sides and has a predetermined thickness, the optical device according to the disclosure of the present application can be produced by overmolding the substrate with a layer-forming material. During overmolding, flowable layer-forming material can be distributed over a layer-forming injection molding space around the substrate and enclose it. This results in a substrate-enveloping layer during solidification, which gives the optical device a high mechanical robustness and prevents individual lenses from detaching.

Preferably, the optical device according to the disclosure of the present application includes an image-bearing layer which is arranged between the substrate and at least one lens-forming portion of the transparent layer. This makes it possible to use the optical device as a projector.

Preferably, the transparent layer includes an injection point on a substrate side facing away from the lens. From the injection point, a flowable layer-forming material is distributed in the layer-forming injection molding space during a manufacturing process. The fact that the injection point is located on a substrate side facing away from the lens ensures that an optically functional area of the optical device is not impaired by injection defects and/or production-related artifacts, such as injection webs.

Preferably, the transparent layer of the optical device according to disclosure of the present application has a thickness in the range of 0.5 mm to 5 mm. Particularly preferably, the thickness is between 0.5 mm and 1 mm. As a result, a sufficient material flow can be ensured in a manufacturing process with an injection molding process.

Preferably, the transparent layer of the optical device according to the disclosure of the present application is so thick that at least one second optical lens lies in a focal point of a first optical lens and at least a partial area of the image-bearing layer lies in the focal point of the at least one second optical lens. This enables sharp projection of image information stored in the image-carrying layer.

Particularly preferably, the substrate of the optical device according to the disclosure of the present application consists of a substrate material, such as glass, and the transparent layer consists of a layer material which has a lower melting and/or glass transition temperature than the substrate material, such as polycarbonate (PC), polymethyl methacrylate (PMMA), cycloolefin polymer (COP), cycloolefin copolymer (COC) or other optically transparent plastics, in particular polymers with thermoplastic behavior. This makes it possible to manufacture the optical device in a process temperature range in which the substrate material is temperature-stable and the coating material is injection-moldable. As a result, temperature-induced damage to the substrate, such as deformation or melting, can be avoided during a manufacturing process.

Preferably, the first optical lenses and the second optical lenses of the optical device according to the disclosure of the present application have the same dimensions. This means that they can be manufactured using the same injection mold. For example, in a manufacturing process, the first optical lenses can first be injection-molded onto a first substrate side and then, by rotating the substrate and/or the injection mold, the second optical lenses can be injection-molded onto a second substrate side using the same injection mold.

Preferably, the first optical lenses consist of a first layer material with a first refractive index and the second optical lenses consist of a second layer material with a second refractive index, wherein the first refractive index is so large that at least one second optical lens lies in a focal point of a first optical lens and wherein the second refractive index is so large that at least a partial area of the image-bearing layer lies in the focal point of the at least one second optical lens. This enables sharp projection of image information stored in the image-carrying layer despite the first and second optical lenses having the same dimensions.

The method for producing an optical device according to the disclosure of the present application includes the steps of S1: applying an image carrier layer to a transparent substrate; S2: positioning the substrate in an injection mold; and S3: injection molding a layer-forming material into the injection mold, so that the layer-forming material solidifies to form a coherent transparent layer which encloses the substrate on at least three sides, and which forms a plurality of first optical lenses on a first surface and which forms a plurality of second optical lenses on a second surface arranged opposite the first surface of the substrate.

By injection molding the first and second optical lenses on opposite substrate sides, thickness deviations between different substrates can be compensated. Given by the injection mold, the first and second lenses always have the same distance to each other, the same shape and thus the same optical functionality, regardless of possible substrate thickness variations.

The dependent claims describe further advantageous embodiments of the invention.

Preferred embodiments are explained in more detail with reference to the following figures.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
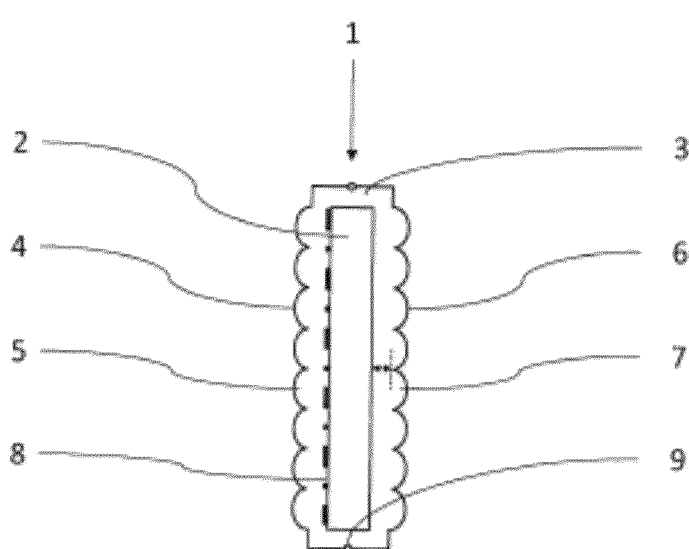
FIG. 1 shows a side view of a first example of an optical device according to the disclosure of the present application.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
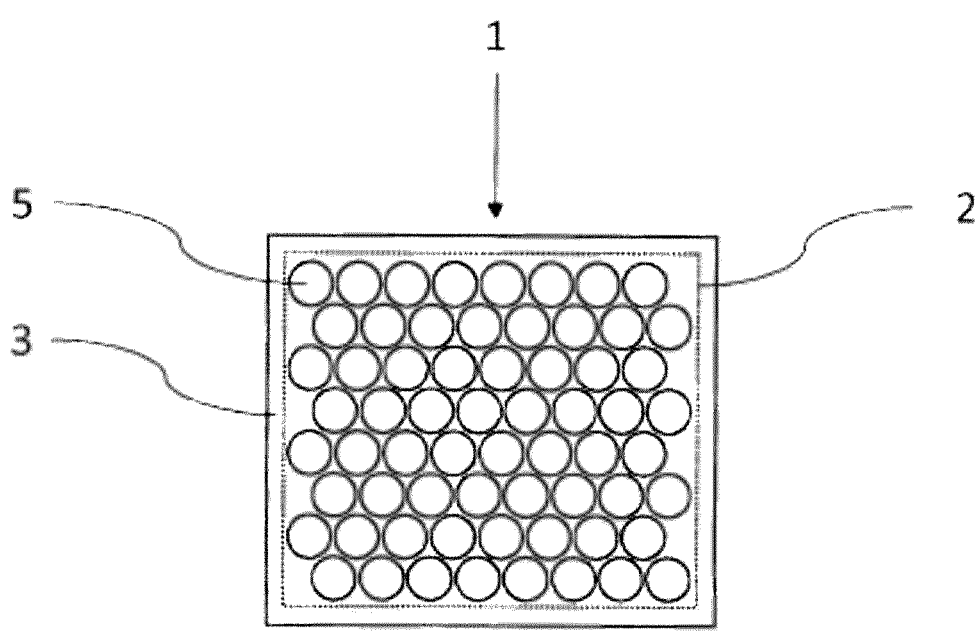
FIG. 2 shows a top view of the optical device shown in FIG. 1.

The first example of an optical device 1 according to the disclosure of the present application shown in FIGS. 1 and 2 is a multi-lens array (MLA), which can be used as a projector in combination with a light source.

The optical device 1 comprises a transparent substrate 2. In the embodiment example, this is a rectangular planar glass plate. An image carrier layer 8, which is covered by device 1, is applied to the front side of substrate 2. This is formed as a thin metal layer structured by lithography or LASER.

Furthermore, substrate 2 with the image-carrying layer 8 is enclosed on all sides by an injection-molded, coherent transparent layer 3 made of polycarbonate (PC). On the front side of the substrate 2, the transparent layer 3 forms a plurality of first optical lenses 5 on a first surface 4. as shown in FIG. 1, the image-bearing layer 8 is located between the substrate 2 and the lens-forming layer area. The rear side of substrate 2 is also from the transparent substrate side, the transparent layer 3 forms a plurality of second optical lenses 7 on a second surface 6.

In the example, the first optical lenses 5 serve as light coupling bodies. Light generated by a light source pass through the first optical lenses 5 onto the image carrier layer 8. A portion of the light can pass through structured areas of the image carrier layer 8 and pick up image information. The transmitted light then exits the optical device 1 through the second optical lenses 7. The transparent layer 3 on the front and back of the substrate 2 is so thick that the second optical lens 7 lies in a focal point of the first optical lenses 5 and the image-bearing layer 8 lies in the focal point of the second optical lenses 7. This allows the emerging light image to produce a sharp light image in a projection plane.

Furthermore, the four outer sides of the rectangular planar glass plate are also enclosed by the transparent layer 3. Only small partial areas on the sides of the glass plate (not shown), where it was clamped in an injection mold during a manufacturing process, are not covered by polymer due to the manufacturing process.

In the example, the transparent layer 3 has a predetermined thickness of 1 mm on all sides of substrate 2. In areas in which the transparent layer 3 forms optical lenses 5, 7, the specified thickness is illustrated by a double arrow in FIG. 1. The specified thickness makes it possible to produce optical device 1 shown in FIGS. 1 and 2 by overmolding the substrate 2. In this process, heated liquid PC can flow around substrate 3 via a layer-forming injection molding space that defines the thickness of the transparent layer 3.

Since the glass from which substrate 2 is made has a significantly higher melting temperature than the PC that forms the layer, temperature-induced substrate damage can be avoided during the manufacturing process. In further embodiments not shown, substrate 2 can also consist of a high-melting transparent polymer. Furthermore, substrate 2 and the transparent layer 3 can also consist of different types of glass with different melting points.

In the example, the transparent layer 3 comprises two injection points 9 (see FIG. 1) on opposite sides of the substrate facing away from the lens. Flowable PC can be distributed from the injection points 9 in the layer-forming injection-molding during a manufacturing process. This ensures that the optical functionality of the lens-forming layer areas is not impaired by injection artifacts and/or defects.

Figure 3:
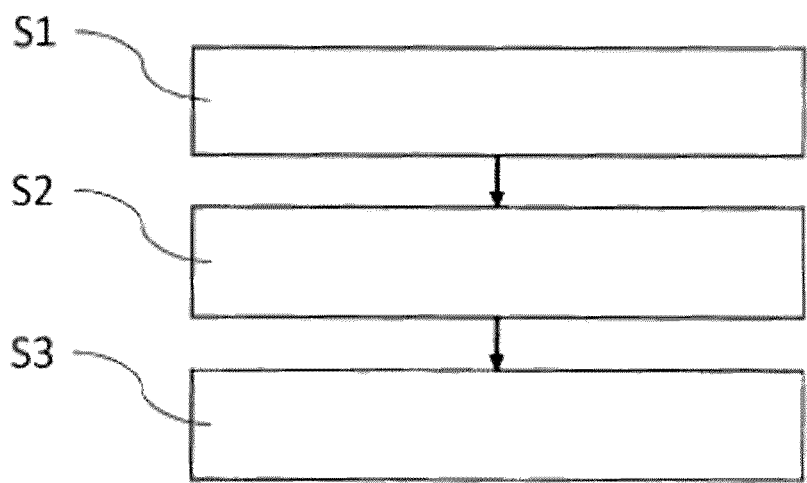
FIG. 3 shows a first example of a method of manufacturing an optical device according to the disclosure of the present application.

A first example of a process according to the disclosure of the present application suitable for the manufacture of the optical device 1 shown in FIGS. 1 and 2 is shown in FIG. 3. In the first step S1 of the process, a gas phase cutter applies a thin metallic image-bearing layer 8 to a transparent substrate 2. This is structured in a subsequent lithography process. In the second step S2 of the process, a machine or worker intended for this purpose positions substrate 2 with the image carrier layer 8 in an injection mold. In the third step S3 of the process, an injection molding machine injects molten PC into the injection mold. The PC flows around the substrate 2 on all sides and forms a coherent transparent layer 3 during solidification, which forms a plurality of first optical lenses 5 on a first surface 4 and which forms a plurality of second optical lenses 7 on a second surface 6 arranged on the opposite side of the substrate to the first surface 4.

A second example of an optical device according to the disclosure of the present application also has the structure shown schematically in FIG. 1, comprising a substrate 2, a transparent layer 3, an image-bearing layer 8, first optical lenses 5 and second optical lenses 7. The first and second optical lenses 5 and 7 are manufactured using the same injection mold and have the same dimensions. In this context, "equally dimensioned" means that for each first optical lens 5 there is a corresponding second optical lens 7 on an opposite substrate side, which has the same geometric dimensions and degrees of curvature.

The first optical lenses 5 consist of a first coating material, in the example PMMA, with a first refractive index of 1.49 and the second optical lenses 7 consist of a second coating material, in the example a transparent polyester (OKP optical plastic), with a second refractive index of 1.64. The first refractive index and the substrate and layer dimensions are selected so that all second lenses 7 lie in the focal points of the respective first lines 5. Furthermore, the second refractive index is chosen so that the focal point of each second optical lens 7 lies in the image transmission gap 8. This allows the emerging light image to produce a sharp light image in one projection plane.

The second embodiment of the optical device according to the disclosure of the present application can be produced using a second embodiment of a method according to the disclosure of the present application (not shown). In the first step S1 of the process, a cathode sputtering system applies a thin metallic image-bearing layer 8 to a transparent substrate 2. This is then structured using a LASER. In the second step S2 of the process, a machine or worker intended for this purpose positions substrate 2 with the image-bearing layer 8 in an injection mold. In the third step S3 of the process, an injection molding machine injects molten PMMA and molten transparent polyester into the injection mold.

The third step S3 is executed in three sub-steps S3*a*, S3*b*, S3*c*. In step S3*a*, the injection molding system first injects a first partial area of the transparent PMMA layer onto the first substrate side. The first partial area protrudes beyond the first substrate side and surrounds the substrate edges. During solidification, the first partial area forms the first optical lenses 5 on the first surface 4. Subsequently, in the second sub-step S3*b*, a machine provided for this purpose repositions the substrate in the injection mold. In the example, this is done by rotating an index plate that holds the substrate. In further embodiments, the repositioning can also be realized by rotating an injection molding tool with a turntable or by moving the substrate 2 relative to the injection molding tool.

In the third sub-step S3*c*, the injection molding machine injects a second partial area of the transparent layer 3 made of molten transparent polyester onto a second substrate side. During solidification, the second partial area forms the second optical lenses 7 on a second surface. The second partial area protrudes beyond the second substrate side and forms a substance-to-substance bond with the first partial area at the substrate edges.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An optical device comprising:
a transparent substrate;
a coherent transparent layer enclosing the substrate in at least three places, which forms a plurality of first optical lenses on a first surface and forms a plurality of second optical lenses on a second surface arranged opposite the first surface of the substrate, the transparent layer having a predetermined thickness; and
an image-bearing layer arranged between the substrate and at least one lens-forming portion of the transparent layer.

2. The optical device according to claim 1, wherein the transparent layer is produced by overmolding the substrate.

3. The optical device according to claim 1, wherein the transparent layer comprises an injection point on a substrate side facing away from the lenses.

4. The optical device according to claim 1, wherein the transparent layer has a thickness in a range of 0.5 mm to 5 mm.

5. The optical device according to claim 1, wherein the transparent layer has a thickness such that at least one second optical lens lies in a focal point of a first optical lens and at least a partial region of the image-bearing layer lies in the focal point of the at least one second optical lens.

6. The optical device according to claim 1, wherein the substrate consists of a substrate material and the transparent layer consists of at least one layer material which has a lower melting and/or glass transition temperature than the substrate material.

7. The optical device according to claim 1, wherein the first optical lenses and the second optical lenses have the same dimensions.

8. The optical device according to claim 7, wherein:
the first optical lenses consist of a first layer material with a first refractive index and the second optical lenses consist of a second layer material with a second refractive index;
the first refractive index is so large that at least one second optical lens lies in a focal point of a first optical lens; and
the second refractive index is so great that at least a partial region of the image-bearing layer lies in the focal point of the at least one second optical lens.

9. A method of manufacturing an optical device, comprising the steps of:
S1: applying an image-bearing layer to a transparent substrate;
S2: positioning the substrate in an injection mold; and
S3: injection molding of a layer-forming material into the injection mold, so that the layer-forming material, by solidifying, forms a coherent transparent layer which encloses the substrate on at least three sides and which forms a plurality of first optical lenses on a first surface and which forms a plurality of second optical lenses on a second surface arranged on a side of the substrate opposite to the first surface.

10. The method according to claim 9, wherein during injection molding in step S3 liquid layer-forming material flows around the substrate simultaneously on at least three sides.

11. The method according to claim 9, wherein the injection molding in step S3 comprises the sub-steps:

S3*a*: injection molding of a first portion of the transparent layer comprising the first optical lenses, S3*b*: repositioning the substrate and/or an injection molding tool, S3*c*: injection molding of a second partial region of the transparent layer, comprising the second optical lenses, wherein the second partial region is bonded to the first partial region in a material-locking manner.

* * * * *